US010795596B1

(12) United States Patent
Shabi et al.

(10) Patent No.: US 10,795,596 B1
(45) Date of Patent: Oct. 6, 2020

(54) DELAYED DEDUPLICATION USING PRECALCULATED HASHES

(71) Applicant: EMC IP Holding Company LLC, Hopkinton, MA (US)

(72) Inventors: Uri Shabi, Tel Mond (IL); Vladimir Shveidel, Pardes-Hana (IL); Ronen Gazit, Tel Aviv (IL); Alex Soukhman, Raanana (IL); Maor Rahamim, Ramla (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/398,718

(22) Filed: Apr. 30, 2019

(51) Int. Cl.
*G06F 3/00* (2006.01)
*G06F 3/06* (2006.01)
*G06F 7/08* (2006.01)

(52) U.S. Cl.
CPC .......... *G06F 3/0641* (2013.01); *G06F 3/0608* (2013.01); *G06F 3/0659* (2013.01); *G06F 3/0673* (2013.01); *G06F 7/08* (2013.01)

(58) Field of Classification Search
CPC .............................. G06F 3/0641; G06F 3/0608
USPC ........................................................ 711/154
See application file for complete search history.

(56) References Cited

U.S. PATENT DOCUMENTS 9,959,049 B1 5/2018 Armangau
9,985,649 B1 5/2018 Bassov et al.
10,229,131 B2 * 3/2019 Akirav ................ G06F 16/1748
10,372,687 B1 8/2019 Armangau et al.
2017/0103068 A1 * 4/2017 Araki .................. G06F 17/3015
2019/0129970 A1 5/2019 Armangau et al.
2019/0236163 A1 8/2019 Bassov et al.

FOREIGN PATENT DOCUMENTS

WO 2018/199795 11/2018

OTHER PUBLICATIONS

Armangau, Philippe, et al.; "Inline Deduplication of Compressed Data," U.S. Appl. No. 14/980,944, filed Dec. 28, 2015.
Armangau, Philippe, et al.; "Content-Based Caching Using Digests," U.S. Appl. No. 15/668,307, filed Aug. 3, 2017.
Shabi, Uri, et al.; "Sub-Block Deduplication Using Sector Hashing," U.S. Appl. No. 16/397,131, filed Apr. 29, 2019.

* cited by examiner

Primary Examiner — Jae U Yu
(74) Attorney, Agent, or Firm — BainwoodHuang (57) ABSTRACT

A method of performing deduplication by a computing device is provided. The method includes (a) as data is received by the computing device into blocks as part of write requests, creating an entry in a log for each of the blocks, each entry including information about that respective block and a digest computed from that respective block; and (b) after accumulating multiple entries in the log, processing the log for delayed deduplication, the processing including (i) retrieving digests from the log, (ii) performing lookups within a deduplication table of the retrieved digests, and (iii) performing deduplication operations based on the lookups using the information about blocks included within the log. An apparatus, system, and computer program product for performing a similar method are also provided.

16 Claims, 3 Drawing Sheets

Fig. 1

DELAYED DEDUPLICATION USING PRECALCULATED HASHES

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems support data "deduplication." A common deduplication scheme involves replacing redundant copies of a data block with pointers to a single retained copy. Such schemes may involve computing digests of data blocks and storing the digests in a database. Each digest is computed as a hash of a data block's contents and identifies the data block with a high level of uniqueness, even though the digest is typically much smaller than the data block itself. Digests thus enable block matching to proceed quickly and efficiently, without having to compare blocks byte-by-byte. For each digest, the database stores a pointer that leads to a stored version of the respective data block. To perform deduplication on a particular candidate block, a storage system computes a digest of the candidate block and searches the database for an entry that matches the computed digest. If a match is found, the storage system arranges metadata of the candidate block to point to the data block that the database has associated with the matching digest. In this manner, a duplicate copy of the data block is avoided.

Some storage systems implement deduplication "inline." In inline deduplication, as a data block is ingested into the storage system, the storage system computes its digest and searches a cached portion of the database for an entry that matches the computed digest. If a match is found, the storage system arranges the metadata of the new block to point to the data block that the database has associated with the matching digest, without needing to write the new data block to disk. If no match is found, the new data block is stored without any deduplication.

SUMMARY

Conventional deduplication schemes generally operate in the background, inline, or both. Unfortunately, even systems that support both background and inline deduplication can miss many opportunities to remove or avoid duplicate content. For example, background deduplication can be extremely thorough, but it is also disk intensive and slow. Inline deduplication is effective, but it can be costly in terms of processor requirements; it may even stop working when storage demands become too high. Although inline deduplication can theoretically be as thorough as background deduplication, such implementations require extremely large amounts of memory to cache the database of digests. Since that large amount of cache is typically not available, many implementations of inline deduplication are not as thorough as background deduplication. In such implementations, background deduplication may also be used, which can result in reduced storage efficiency until the background deduplication is performed as well as inefficient usage of processing resources and I/O bandwidth.

What is needed is a way to leverage the benefits of inline deduplication without consuming the same level of system resources. In contrast with prior approaches, improved techniques for performing data deduplication store digests of newly-ingested data blocks in a log together with information about the respective blocks. Later, a delayed deduplication process goes through the log and performs deduplication on the data blocks referenced in the log. Since digest values of the data blocks are already stored in the log, there is no need to load the data blocks into memory to perform deduplication, as would be required if performing deduplication in the background. Rather, deduplication can proceed based only on the content in the log. Although such deduplication is not exactly inline, it is nevertheless near-inline, offering many of the same benefits as fully inline deduplication. Such benefits are provided without incurring the costs in terms of resource consumption, as the most resource-intensive tasks can be deferred until resources become more readily available. In some embodiments, other newly-ingested blocks can be deduplicated inline if they are found within a cached portion of the deduplication database, leaving the remaining data blocks to be deduplicated on a delay via the log. In some embodiments, various optimizations may be made by sorting the log.

Advantageously, the improved techniques avoid redundant storage of identical data blocks in an efficient manner, even when the system is not able to perform full inline deduplication. Storage efficiency and speed are thereby improved.

In one embodiment, a method of performing deduplication by a computing device is provided. The method includes (a) as data is received by the computing device into blocks as part of write requests, creating an entry in a log for each of the blocks, each entry including information about that respective block and a digest computed from that respective block; and (b) after accumulating multiple entries in the log, processing the log for delayed deduplication, the processing including (i) retrieving digests from the log, (ii) performing lookups within a deduplication table of the retrieved digests, and (iii) performing deduplication operations based on the lookups using the information about blocks included within the log. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for performing data deduplication that store digests of newly-ingested data blocks in a log together with information about respective blocks. Later, a delayed deduplication process goes through the log and performs deduplication on the data blocks referenced in the log. Since digest values of the data blocks are already stored in the log, there is no need to load the data blocks into memory to perform deduplication, as would be required if performing deduplication in the background. Rather, deduplication can proceed based only on the content in the log. Although such deduplication is not exactly inline, it is nevertheless near-inline, offering many of the same benefits as fully inline deduplication. Such benefits are provided without incurring the costs in terms of resource consumption, as the most resource-intensive tasks can be deferred until resources become more readily available. In some embodiments, other newly-ingested blocks can be deduplicated inline if they are found within a cached portion of the deduplication database, leaving the remaining data blocks to be deduplicated on a delay via the log. In some embodiments, various optimizations may be made by sorting the log.

Advantageously, the improved techniques avoid redundant storage of identical data blocks in an efficient manner, even when the deduplication database is too large to fit within memory. Storage efficiency and speed is thereby improved.

Figure 1:
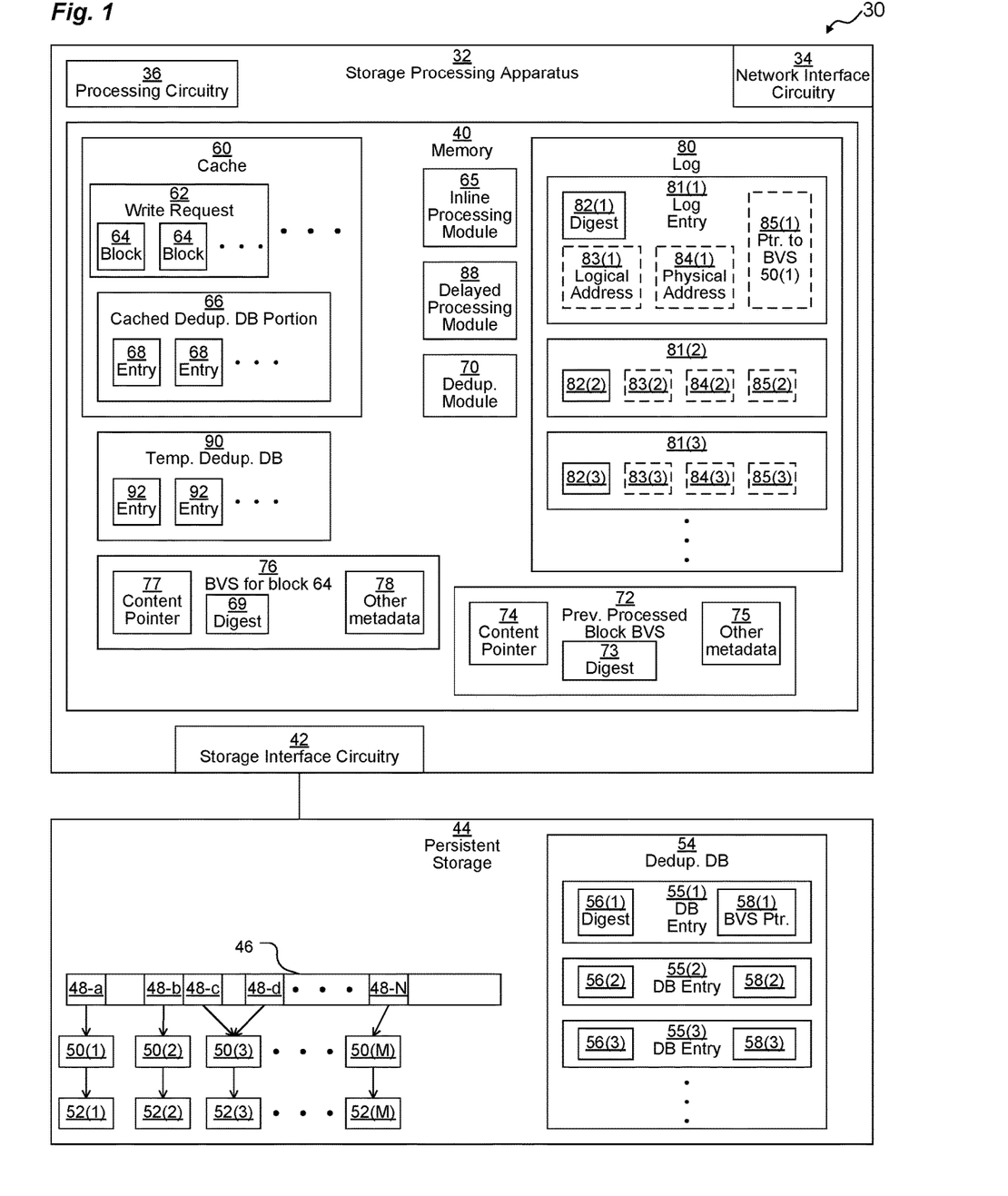
FIG. 1 is a block diagram depicting an example system and apparatus for use in connection with various embodiments.

FIG. 1 depicts an example data storage environment (DSE) 30. DSE 30 may be any kind of computing device or collection (or cluster) of computing devices, such as, for example, a personal computer, workstation, server computer, enterprise server, data storage array device, laptop computer, tablet computer, smart phone, mobile computer, etc.

DSE 30 includes at least one storage processing apparatus 32 and persistent storage 44. In some embodiments, persistent storage 44 is shared between multiple storage processing apparatuses 32. In some embodiments, storage processing apparatus 32 may be implemented as an enclosure housing one or more circuit board assemblies or blades as well as the persistent storage 44.

Storage processing apparatus 32 includes network interface circuitry 34, processing circuitry 36, memory 40, and storage interface circuitry 42. Storage processing apparatus 32 may also include other components as are well-known in the art.

Network interface circuitry 34 may include one or more Ethernet cards, cellular modems, Fibre Channel (FC) adapters, Wireless Fidelity (Wi-Fi) wireless networking adapters, and/or other devices for connecting to a network (not depicted). Network interface circuitry 34 allows the storage processing apparatus 32 to communicate with one or more host devices (not depicted) capable of sending data storage commands to the DSE 30 over the network. In some embodiments, a host application may run directly on the storage processing apparatus 32.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports.

Persistent storage 44 may be logically divided into a plurality of data structures, including a logical address mapping layer 46 (including a set of mapping pointers 48 that represent logical addresses), a set of block virtualization structures (BVSes) 50 (depicted as BVSes 50(1), 50(2), 50(3), . . . , 50(M)), and a set of data extents 52 (depicted as extents 52(1), 52(2), 52(3), . . . , 52(M)). Logical address mapping layer 46 may be structured as a sparse address space that allows logical block addresses to be mapped to underlying storage. Thus, for example, one logical address is represented by mapping pointer 48-*a* that points to BVS 50(1), which points to an underlying data extent 52(1) that stores data of the block of the logical address. A block is the fundamental unit of storage at which persistent storage 44 stores data. Typically a block is 4 kilobytes or 8 kilobytes in size, although block sizes vary from system to system. In some embodiments, each data extent 52 is an actual block of the standardized size. In other embodiments, each data extent 52 may be smaller than or equal to the standard block size, if compression is used.

As depicted, two logical block addresses may share the same underlying data. Thus, logical addresses represented by mapping pointers 48-*c*, 48-*d* both point to a shared BVS 50(3) that is backed by data extent 52(3). Each BVS 50 may store a pointer to a data extent 52 as well as a digest (not depicted), which is a hash of the data of the block backed by the data extent 52. In addition, each BVS 50 may also store a reference count (not depicted) so that it can be determined how many blocks share a single data extent 52, e.g., for garbage collection purposes.

In some embodiments, it is also possible for one BVS 50 to point to another BVS 50 with which it shares some underlying data. For example, a sub-block deduplication scheme may be used in conjunction with principles of this Disclosure. An example of such a sub-block deduplication scheme is described in U.S. patent application Ser. No. 16/397,131, filed on Apr. 29, 2019, and entitled "SUB-BLOCK DEDUPLICATION USING SECTOR HASHING," whose entire contents are incorporated herein by this reference.

Persistent storage 44 also stores a deduplication database (DB) 54 (which may be any type of table, e.g., arranged as a key-value store). Deduplication DB 54 stores a set of entries 55, each of which maps a digest 56 to an indication of location of data. For example, as depicted, the indication of location of data may be a pointer 58 that points to a particular BVS 50. This allows the storage processing apparatus 32 (hereinafter "device" 32) to determine whether all or a portion of the data of a block 64 is already stored in another block of persistent storage 44 that has already been processed for deduplication, and which BVS 50 (and ultimately, which underlying data extent 52) it is associated with. It should be understood that the digests 56 may or may not be stored within each entry 55. In some embodiments, the digests 56 may instead be used as an index into the entries 55, defining their location. In some embodiments, a prefix of each digest 56 may define its location, and the remainder of the digest 56 may be stored within its entry 55.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores an inline processing module 65, a delayed processing module 88, a deduplication module 70, and other software modules which each execute on processing circuitry 36 to fulfill data storage requests (e.g., write requests 62) which are either received from hosts or locally-generated.

Memory 40 also stores a cache portion 60 for temporarily storing data storage requests (e.g., write requests 62), a cached portion 66 of deduplication database (DB) 54, and various other supporting data structures. Memory 40 may also store various other data structures used by the OS, I/O stack, inline processing module 65, delayed processing module 88, deduplication module 70, and various other applications (not depicted).

Cache 60 stores one or more unprocessed blocks 64, which are blocks of data of the standard block size that have not yet been fully processed for deduplication purposes.

In some cases, an unprocessed block 64 may be a newly-received block of data as part of a write request 62 directing the storage processing apparatus 32 to store the data on persistent storage 44 as part of a logical disk represented by logical address mapping layer 46. In these examples, inline processing module 65 may operate to either deduplicate the unprocessed block 64 inline or to persist it and log it for delayed processing by placing a log entry 81 in a log 80.

Inline processing module 65 may operate to hash an unprocessed block 64 to generate a digest 69. Inline processing module 65 applies a hashing algorithm such as, for example, SHA-0, SHA-1, SHA-2, SHA-3, or MD5. Such algorithms may provide bit-depths such as 128 bits, 160 bits, 172 bits, 224 bits, 256 bits, 384 bits, and 512 bits, for example. Preferably an advanced hashing algorithm with a high bit-depth (i.e., 160 bits or higher) is used to ensure a low probability of hash collisions between different blocks.

Inline processing module 65 then looks up the digest 69 in the cached portion 66 of the deduplication DB 54. If an entry 68 (which may have a similar structure to the entries 55 of deduplication DB 54) with a matching digest 56 is found, then inline processing module 65 invokes deduplication module 70 to perform inline deduplication on the block 64.

If no entry 68 is found within the cached portion 66 with a matching digest, then inline processing module 65 stores the calculated digest 69 in a new log entry 81 as digest 82 together with one or more of the logical address 83 of the block 64 within the logical address space 46, the physical address 84 where the block is currently stored (e.g., either a physical location within persistent storage 44 or a memory address within cache 60 that is non-volatile or mirrored), and a pointer 85 to a BVS 50 that is currently associated with that block 64.

In another example, an unprocessed block 64 may have been previously persisted by the inline processing module 65 with its information having been previously logged in log 80. Delayed processing module 88 operates to go through the log 80 and perform deduplication on the unprocessed blocks 64 represented by each log entry 81. In some embodiments, delayed processing module 88 sorts the log entries 81 (e.g., sorting by digest 82, logical address 83, or physical address 84) prior to processing them.

For a particular log entry 81, e.g., log entry 81(1), delayed processing module 88 looks up its digest 82(1) in the full deduplication DB 54. If it finds a matching DB entry 55 (i.e., a DB entry 55 whose digest 56 matches the digest 82(1)), then delayed processing module 88 directs deduplication module 70 to perform inline deduplication on the block 64 by causing its mapping pointer 48 (located using the logical address 83(1)) to point to the previously processed block BVS 72 that was pointed to by the pointer 58 of the DB entry 55. Deduplication module 70 may also free the BVS 76 for the block 64 and cause the block 64 to be deleted from persistent storage 44 (although this may occur after some delay, e.g., due to periodic garbage collection).

If delayed processing module 88 does not find a matching DB entry 55 in the deduplication DB 54, then delayed processing module 88 directs deduplication module 70 to perform inline deduplication on the block 64 by adding a new DB entry 55 to the deduplication DB 54 whose BVS pointer 58 points to the BVS 76 for the block 64, that entry 55 being indexed by the digest 82(1). In some embodiments, instead of adding the new entry 55 directly into the full deduplication DB 54, deduplication module 70 adds an entry 92 into a temporary deduplication DB 90. The entries 92 may have a similar arrangement as DB entries 55. Once the log 80 is fully processed, delayed processing module 88 may merge the entire temporary deduplication DB into the full deduplication DB 54. In these embodiments, delayed processing module 70 performs lookups with respect to both the full deduplication DB 54 and the temporary deduplication DB 90.

Figure 2:
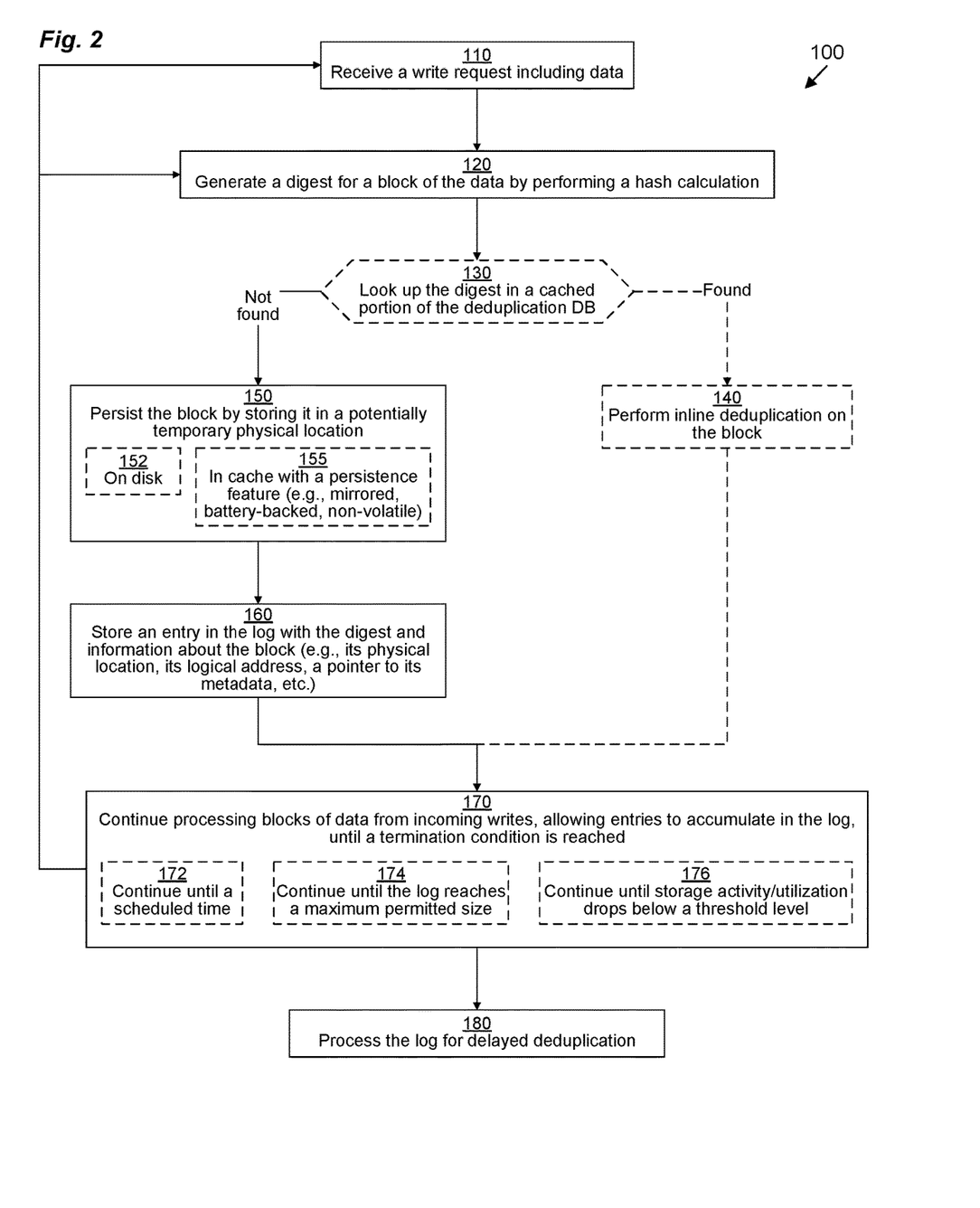
FIG. 2 is a flowchart depicting example methods of various embodiments.

FIG. 2 illustrates an example method 100 performed by device 32 for performing deduplication of unprocessed blocks 64 in accordance with various embodiments. It should be understood that any time a piece of software (e.g, I/O stack, inline processing module 65, delayed processing module, or deduplication module 70) is described as performing a method, process, step, or function, what is meant is that a computing device (e.g., device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Steps and sub-steps marked with dashed lines are either optional or represent alternative embodiments.

In step 110, the I/O stack receives a write request 62 that includes data to be written to one or more logical addresses within logical address mapping layer 46. The data of each write request 62 may be divided into one or more unprocessed blocks 64.

In step 120, inline processing module 65 generates a digest 69 for an unprocessed block 64 that has just been received. For example, SHA-1 hashing may be used, but other types of hashing may be used as well, as described above.

Then, in some embodiments, in step 120, inline processing module 65 looks up the digest 69 in the cached portion 66 of the deduplication DB 54. If it finds a matching entry 68 (i.e., an entry 68 whose digest 56 is the same as the digest 69), then operation proceeds with step 140. In step 140, inline processing module 65 directs deduplication module 70 to deduplicate the unprocessed block 64 right away. Deduplication module 70 may use various inline deduplication techniques, many of which are well-known. In one embodiment, deduplication module 70 may use sub-block deduplication techniques as described in "SUB-BLOCK DEDUPLICATION USING SECTOR HASHING," incorporated above. If the result of step 130 is negative, then operation instead proceeds with step 150.

In embodiments in which inline deduplication is not performed, operation proceeds directly to step 150 after step 120. In step 150, inline processing module 65 persists the block 64 by storing it in a potentially temporary physical location. The location is potentially temporary because upon later deduplication, it may be deleted, with reliance upon a previously stored version. Its temporariness is only potential, however, because if a match is not found, it will remain (although it may later be moved due to garbage collection and defragmentation processes).

In some embodiments, step 150 may be accomplished via sub-step 152. In sub-step 152, the block 64 is persisted by being stored as an extent 52(*x*) on persistent storage 44. Thus, content pointer 77 of BVS 76 for the block 64 is set to point to extent 52(*x*), and BVS 76 may also be persisted as a BVS 50.

In other embodiments, step 150 may be accomplished via sub-step 155. In sub-step 152, the block 64 is persisted by being stored within cache 60 but with a persistence feature. The persistence feature may be, for example, a battery-backed portion of memory 40 or a non-volatile portion of memory 40. As another example, the persistence feature may include mirroring the block 64 into a cache of another storage processing apparatus 32 with an independent power-supply. Content pointer 77 of BVS 76 for the block 64 is set to point to the block 64 within cache, as persisted. If the contents of cache 60 are later moved to persistent storage 44 as part of a flushing operation, then content pointer 77 will be updated at that point.

Then, in step 160, inline processing module 65 stores a new log entry 81 in log 80. Inline processing module 65 sets the digest 82 of the log entry 81 to the digest 69 of the block 64. Inline processing module 65 also inserts at least some identifying information about the block 64 into the entry 81. For example, in some embodiments, processing module 65 inserts the logical address 83 (which represents a position within logical address mapping layer 46 of the block 64) and the physical address 84 (which represents the location in persistent storage 44 or cache 60 where the block 64 is stored) into the log entry 81. In some embodiments, inline processing module 65 also inserts a pointer 85 to the BVS 76 of the unprocessed block 64. In some embodiments, one or more of these items 83, 84, 85 may be omitted. For example, since the logical address 83 locates a mapping pointer 48 within logical address mapping layer 46, and since the mapping pointer 48 points to the BVS 76, the pointer 85 to the BVS 76 may be omitted. In addition, since the BVS 76 includes a content pointer 77 that points to the physical location of the block 64, the physical address 84 may also be omitted.

After adding the log entry 81 to the log 80 for a given block 64, in step 170, inline processing module 65 continues on to process additional blocks 64 that were recently received as part of write requests 62 until multiple log entries 81 have accumulated in the log 80 and a termination condition is reached. For example, in some embodiments, in sub-step 172, processing of new unprocessed blocks 64 continues until a scheduled time; for example, the scheduled time may be every day at 1 AM, local time. In other embodiments, in sub-step 174, processing of new unprocessed blocks 64 continues until the log 80 reaches a maximum predetermined size (e.g., 1 gigabyte, 1 million entries 81, etc.). In yet other embodiments, in sub-step 176, processing of new unprocessed blocks 64 continues until a storage activity level or a processing utilization level of the device 32 drops below a predetermined threshold value. For example, the threshold storage activity level may be 1 write operation per minute. As another example, the threshold processing utilization level may be 10% of the processing capacity of processing circuitry 36, averaged over the past minute.

If the termination condition has not yet been reached, then operation proceeds back to step 120 to process additional unprocessed blocks 64 that have already been received or to step 110 to receive new write requests 62 with additional unprocessed blocks 64.

Once the termination condition is reached, however, step 170 proceeds with step 180, in which the delayed processing module 88 is invoked to process the log 80. In some embodiments, step 180 may be implemented as method 200 of FIG. 3.

Figure 3:
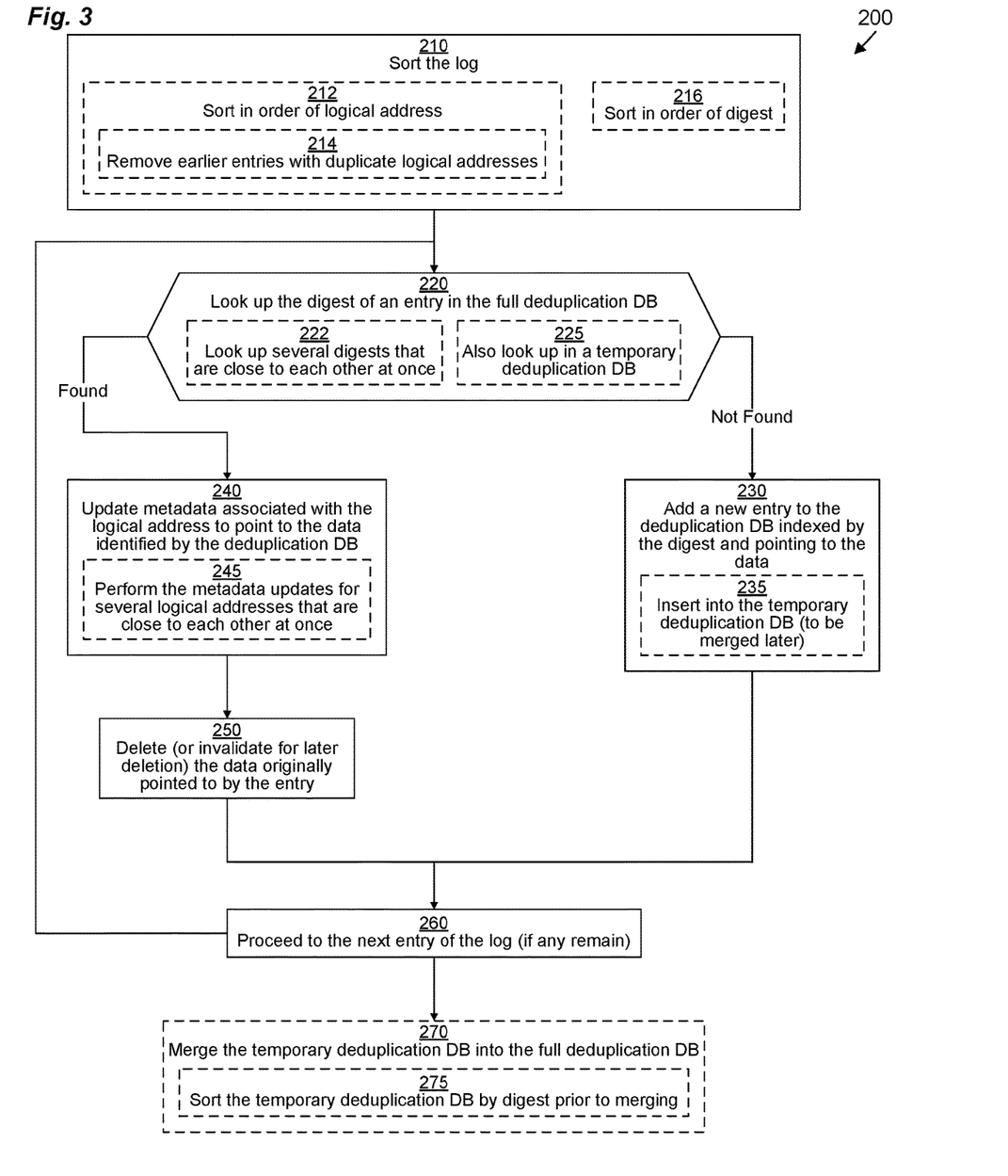
FIG. 3 is a flowchart depicting example methods of various embodiments.

FIG. 3 illustrates an example method 200 performed by device 32 for performing step 180 in accordance with various embodiments. It should be understood that one or more of the steps or sub-steps of method 200 may be omitted in some embodiments. Similarly, in some embodiments, one or more steps or sub-steps may be combined together or performed in a different order.

In step 210, delayed processing module 88 sorts the log 80. In some embodiments, step 210 includes sub-step 212, in which the sorting is done based on the logical addresses 83 of the entries 81. A benefit of this approach is that adjacent mapping pointers 48 and/or BVSes 50 of adjacent entries 81 can be loaded in groups, allowing the processing of the log 80 to be optimized by requiring fewer sequential reads and writes rather than more random reads and writes. In addition, in sub-sub-step 214, delayed processing module 88 may remove redundant entries 81. For example, since a later write operation directed to the same logical address 83 as an earlier write operation renders the earlier write operation moot (as long as the write operations are full block writes), if, upon sorting by logical address 83, there are several entries 81 that all share the same logical address 83, then only the latest of these log entries need be retained. In the embodiment of sub-sub-step 214, each log entry 81 may include a timestamp indicating when its unprocessed block 64 was received in a write request 62.

In some embodiments, step 210 includes sub-step 216, in which the sorting is done based on the digests 82 of the entries 81. One benefit of this approach is that numerically-close digests 83 may be found in proximity within the deduplication database 54, which may allow for optimized lookup of several digests 82 at once in step 220 below. Another benefit of this approach is that it allows the deduplication DB 54 to be updated more efficiently (see below in connection with step 270).

After sorting the log 80, delayed processing module 88 processes the log 80 by processing its entries 81 sequentially (although, in some embodiments, several entries 81 may be processed in parallel or concurrently).

In step 220, delayed processing module 88 looks up the digest 82 of a log entry 81 in the full deduplication DB 54. In some embodiments (e.g., if the log 80 was sorted by digest 82 in sub-step 216 above), in sub-step 222, delayed processing module 88 is able to simultaneously look up the digests 82 off several adjacent log entries 81, since the digests 82 may all be found in proximity within the deduplication DB 54, allowing a single sequential read to load all the relevant DB entries 55 at once. In some embodiments, in sub-step 225, in addition to looking up the digests 82 within the deduplication DB 54, delayed processing module 88 also looks up the digests 82 within temporary deduplication DB 90. If a matching entry 92 is found within the temporary deduplication DB 90, it takes precedence over a matching entry 55 found within the deduplication DB 54.

If a matching entry 55, 92 is not found, then operation proceeds with step 230. In step 230, deduplication module 70 adds a new DB entry 55 to the deduplication DB 55 that is indexed by the digest 82. The new entry 55 points to the contents of the block 64. For example, the pointer 85 to the BVS 76 of the block 64 may be copied from the log entry 81 to the BVS pointer 58 of the new DB entry 55. In some embodiments, step 230 is implemented by, in sub-step 235, inserting a new entry 92 into the temporary deduplication DB 90 to be merged into the deduplication DB 54 later (see step 270 below). Operation then proceeds with step 260.

If a matching entry 55, 92 is found, then operation proceeds with step 240. In step 240, deduplication module 70 updates metadata associated with the logical address 83 to point to data contents identified by the matching entry 55, 92. In some embodiments, the matching entry 55, 92 includes a BVS pointer 58 that points to a previously processed block BVS 72, which itself includes a content pointer 74 that points to a data extent 52 in persistent storage 44 where the same data was previously stored. Thus, in some embodiments, the mapping pointer 48 at the location defined by the logical address 83 can be changed to point to the previously processed block BVS 72 instead of the BVS 76, which can then be freed. The other metadata 75 of the previously processed block BVS 72 can be updated to increase its reference count (not depicted), indicating that it is now shared with another logical address 83. In other embodiments, instead of changing the mapping pointer 48, the content pointer 77 of the BVS 76 can be changed to point to the previously processed block BVS 72.

In embodiments in which sub-step 212 was performed, step 240 may be implemented by sub-step 245, in which the metadata updates (e.g., modifying the mapping pointers 48 and/or the other metadata 75 of the previously processed block BVSes 72) for several adjacent entries 81 are performed simultaneously with a single sequential read operation and a single sequential write operation.

In step 250, deduplication module 70 deletes the data (e.g., an extent 52 or a block 64 in cache 60) that was pointed to by the content pointer 77 of the BVS 76. In some embodiments, instead of deleting the data immediately, deduplication module 70 may instead mark the data as invalid for later deletion by a garbage collection process.

In step 260, after processing each entry 81, delayed processing module 88 moves on to the next entry 81 of the log 80 that has not yet been processed, until none remain.

In step 270, in embodiments in which a temporary deduplication log 90 is used, delayed processing module 88 merges the entries 92 of the temporary deduplication log 90 into the full deduplication DB 54. In some embodiments, step 270 includes a preliminary sub-step of sorting the entries 92 of the temporary deduplication log 90 by digest 56 value to speed the merging process. In other embodiments (e.g., if sub-step 216 was performed earlier), the entries 92 of the temporary deduplication log 90 may already be in order by digest 56.

Thus, techniques have been presented for performing data deduplication that store digests 69, 82 of newly-ingested data blocks 64 in a log 80 together with information 83, 84, 85 about respective blocks 64. Later, a delayed deduplication process (e.g., method 200) goes through the log 80 and performs deduplication on the data blocks 64 referenced in the log 80. Since digest values 69, 82 of the data blocks 64 are already stored in the log 80, there is no need to load the data blocks 64 into memory 40 to perform deduplication, as would be required if performing deduplication in the background. Rather, deduplication can proceed based only on the content in the log 80. Although such deduplication is not exactly inline, it is nevertheless near-inline, offering many of the same benefits as fully inline deduplication. Such benefits are provided without incurring the costs in terms of resource consumption, as the most resource-intensive tasks can be deferred until resources become more readily available. In some embodiments, other newly-ingested blocks 64 can be deduplicated inline (e.g., step 140) if they are found within a cached portion 66 of the deduplication database 54, leaving the remaining data blocks 64 to be deduplicated on a delay via the log 80. In some embodiments, various optimizations may be made by sorting the log 80.

Advantageously, the improved techniques avoid redundant storage of identical data blocks in an efficient manner, even when the system 30 is not able to perform full inline deduplication. Storage efficiency and speed are thereby improved.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of performing deduplication by a computing device, the method comprising:
- as data is received by the computing device into blocks as part of write requests, creating an entry in a log for each of the blocks, each entry including information about that respective block and a digest computed from that respective block; and
- after accumulating multiple entries in the log, processing the log for delayed deduplication, the processing including (i) retrieving digests from the log, (ii) performing lookups within a deduplication table of the retrieved digests, and (iii) performing deduplication operations based on the lookups using the information about blocks included within the log.

2. The method of claim 1,
- wherein the information included in each entry of the log includes a logical address where its respective block is to be written;
- wherein the method further includes sorting the entries of the log by their respective included logical addresses;
- wherein performing deduplication operations using the information about the blocks includes performing a single write operation to adjust mapping metadata of multiple blocks identified by adjacent entries of the log to cause the mapping metadata to point to respective locations returned by the lookups for those adjacent entries.

3. The method of claim 2,
- wherein the information stored in each entry of the log includes a timestamp indicating when a write request was received for its respective block of data; and
- wherein sorting the entries of the log by their respective stored logical addresses includes removing from the log entries that include a same logical address as another entry having a later timestamp.

4. The method of claim 1,
- wherein the method further includes sorting the entries of the log by their respective included digests; and
- wherein performing lookups of the retrieved digests includes performing a single read operation within the deduplication table to look up multiple digests in the deduplication table retrieved from adjacent entries of the log.

5. The method of claim 1,
- wherein the information included in each entry of the log includes a logical address where its respective block is to be written;
- wherein processing the log for delayed deduplication further includes finding a retrieved digest in a deduplication entry (dedup entry) in the deduplication table, the dedup entry identifying a physical location of data of a block; and
- wherein performing deduplication operations based on the lookups using the information about blocks included within the log includes adjusting mapping metadata of the logical address included in the entry of the log from which the digest was retrieved to point to the physical location identified by the dedup entry.

6. The method of claim 5,
- wherein the method further comprises, as the set of data is received, persistently storing each of the blocks in a respective physical location, including indicating that physical location in respective mapping metadata for that block; and
- wherein performing deduplication operations based on the lookups using the information about blocks included within the log further includes causing the data stored at a prior physical location pointed to by the mapping data of the of the logical address included in the entry of the log from which the digest was retrieved prior to being adjusted to be deleted.

7. The method of claim 1,
- wherein the method further comprises, as the set of data is received, persistently storing each of the blocks in a respective physical location, including indicating that physical location in respective mapping metadata for that block; and
- wherein processing the log for delayed deduplication further includes failing to find a retrieved digest in the deduplication table; and
- wherein performing deduplication operations based on the lookups using the information about blocks included within the log includes inserting a new deduplication entry (dedup entry) into the deduplication table indexed by the retrieved digest, the new dedup entry identifying the physical location of data of a block identified by the entry of the log from which the digest was retrieved.

8. The method of claim 7,
- wherein performing lookups of the retrieved digests also includes searching a temporary deduplication table;
- wherein failing to find the retrieved digest in the deduplication table further includes failing to find the retrieved digest in the temporary deduplication table; and
- wherein inserting the new dedup entry into the deduplication table includes:
  - inserting the new dedup entry into the temporary deduplication table; and
  - after accumulating multiple dedup entries in the temporary deduplication table, merging the temporary deduplication table into the deduplication table.

9. The method of claim 8 wherein merging the temporary deduplication table into the deduplication table is performed after completing processing the log for delayed deduplication.

10. The method of claim 8 wherein the method further comprises sorting the dedup entries in the temporary deduplication table by digest prior to merging the temporary deduplication table into the deduplication table.

11. The method of claim 1 wherein processing the log for delayed deduplication is performed at a scheduled time.

12. The method of claim 1 wherein processing the log for delayed deduplication is performed when the log reaches a predetermined size.

13. The method of claim 1 wherein processing the log for delayed deduplication is performed when storage activity directed at the computing device drops below a predetermined threshold.

14. The method of claim 1,
- as additional data is received by the computing device into additional blocks as part of write requests:
  - (i) generating an additional digest for each of the additional blocks;
  - (ii) looking up a set of the additional digests in a cached portion of the deduplication table;
  - (iii) finding a first subset of the additional digests in the cached portion, and, in response, performing inline deduplication on the additional blocks that yielded the first subset; and (iv) for a second subset of the additional digests that are not in the first subset, storing the additional digests of the second subset in respective entries in the log.

15. An apparatus comprising processing circuitry coupled to memory configured to:
   as data is received by the computing device into blocks as part of write requests, creating an entry in a log for each of the blocks, each entry including information about that respective block and a digest computed from that respective block; and
   after accumulating multiple entries in the log, process the log for delayed deduplication, the processing including:
      (i) retrieving digests from the log,
      (ii) performing lookups within a deduplication table of the retrieved digests, and
      (iii) performing deduplication operations based on the lookups using the information about blocks included within the log.

16. A computer program product comprising a non-transitory computer-readable storage medium storing a set of instructions, which, when executed by a computing device cause the computing device to perform deduplication by:
   as data is received by the computing device into blocks as part of write requests, creating an entry in a log for each of the blocks, each entry including information about that respective block and a digest computed from that respective block; and
   after accumulating multiple entries in the log, processing the log for delayed deduplication, the processing including:
      (i) retrieving digests from the log,
      (ii) performing lookups within a deduplication table of the retrieved digests, and
      (iii) performing deduplication operations based on the lookups using the information about blocks included within the log.

* * * * *